US012294823B2

(12) United States Patent
Graff et al.

(10) Patent No.: US 12,294,823 B2
(45) Date of Patent: May 6, 2025

(54) PIVOT ATTACHMENT FOR HEADPHONES

(71) Applicant: Bose Corporation, Framingham, MA (US)

(72) Inventors: Allen T. Graff, Sutton, MA (US); Daniel C. Haferman, Lynn, MA (US); Zhen Xu, Milford, MA (US); Daniel P. Baker, Warwick, RI (US)

(73) Assignee: Bose Corporation, Framingham, MA (US)

( * ) Notice: Subject to any disclaimer, the term of this patent is extended or adjusted under 35 U.S.C. 154(b) by 127 days.

(21) Appl. No.: 17/881,792

(22) Filed: Aug. 5, 2022

(65) Prior Publication Data

US 2024/0048885 A1 Feb. 8, 2024

(51) Int. Cl.
*H04R 1/10* (2006.01)

(52) U.S. Cl.
CPC .................................... *H04R 1/10* (2013.01)

(58) Field of Classification Search
CPC ...... H04R 1/10; H04R 1/1008; H04R 1/1066; H04R 5/0335; H04R 5/033; H04R 2205/022; H04R 2201/10
USPC ................................ 381/379, 374, 370, 182
See application file for complete search history.

(56) References Cited

U.S. PATENT DOCUMENTS

| | | | | |
|---|---|---|---|---|
| 6,597,792 B1 | 7/2003 | Sapiejewski et al. | | |
| 7,970,159 B2 | 6/2011 | Kleinschmidt et al. | | |
| 9,609,415 B2 | 3/2017 | Taylor | | |
| 10,743,106 B2 | 8/2020 | Daley et al. | | |
| 10,764,671 B2 | 9/2020 | Heaston et al. | | |
| 2011/0206216 A1 | 8/2011 | Brunner | | |
| 2015/0189422 A1 | 7/2015 | Nakano | | |
| 2015/0281823 A1* | 10/2015 | Taylor | H04R 1/1033 381/384 | |
| 2017/0085975 A1 | 3/2017 | Nagata | | |
| 2022/0014837 A1* | 1/2022 | Kikuchi | H04R 1/1066 | |
| 2022/0095028 A1 | 3/2022 | Tseng | | |

FOREIGN PATENT DOCUMENTS

| | | | | |
|---|---|---|---|---|
| CN | 207766491 U | * | 8/2018 | H04R 1/10 |
| CN | 210694300 U | * | 6/2020 | H04R 1/10 |
| WO | WO-2020215354 A1 | * | 10/2020 | H04R 1/10 |

OTHER PUBLICATIONS

International Search Report and Written Opinion dated Nov. 15, 2023 for International application No. PCT/US2023/029391.
Sony: "WH-1000XM3—Service Manual Ver.1.1 2018.10", Oct. 31, 2018 (Oct. 31, 2018) , pp. 1-23, XP093095878, Retrieved from the Internet: URL: https://www.manualslib.com/download/2070987/Sony-Wh-1000xm3.html [retrieved on Oct. 27, 2023] pp. 22-24.

* cited by examiner

*Primary Examiner* — Ahmad F. Matar
*Assistant Examiner* — Sabrina Diaz

(57) ABSTRACT

Headphones include a cushion assembly and a slider telescopically coupled to the cushion assembly. The slider includes a proximal end that is disposed within the cushion assembly and a distal end extending outward from the cushion assembly. A pivot mount is disposed within an opening at the distal end of the slider. A pivot is supported in the pivot mount. The headphones also include an earphone and a yoke that couples the earphone to the slider. The pivot mount is secured to the slider via a fastener, and wherein the yoke is pivotable to a position in which it covers the fastener when the headphones are in use.

17 Claims, 16 Drawing Sheets

PIVOT ATTACHMENT FOR HEADPHONES

BACKGROUND

This disclosure relates to headphones.

SUMMARY

All examples and features mentioned below can be combined in any technically possible way.

In one aspect, headphones include a cushion assembly and a slider telescopically coupled to the cushion assembly. The slider includes a proximal end that is disposed within the cushion assembly and a distal end extending outward from the cushion assembly. A pivot mount is disposed within an opening at the distal end of the slider. A pivot is supported in the pivot mount. The headphones also include an earphone and a yoke that couples the earphone to the slider. The pivot mount is secured to the slider via a fastener, and wherein the yoke is pivotable to a position in which it covers the fastener when the headphones are in use.

Implementations may include one of the following features, or any combination thereof.

In some implementations, the headphones also include a groove formed in an inner surface of the slider and a pivot mount cap. The pivot mount cap includes a hole through which the fastener passes, thereby to secure the pivot mount cap to the pivot mount, and a ridge that engages the groove, thereby inhibiting separation of the pivot mount cap from the slider.

In certain implementations, the pivot mount cap sits proud of the open end of the slider thereby preventing direct contact between the pivot and the slider.

In some cases, the headphones also include a pivot pin that extends through the pivot. Opposing ends of the pivot pin are each received in one of pair of recesses formed in the pivot mount.

In certain cases, the slider defines a slot that allows the pivot to rotate, about the pivot pin, relative to the slider.

In some examples, the pivot mount has a U-shaped body with a pair of arms each of which defines a cavity for receiving a corresponding one of a pair of dampers.

In certain examples, the dampers contact the pivot to damp motion of the pivot and help to center the pivot between the arms.

In some implementations, wiring for powering the earphone extends through the slider.

In certain implementations, the pivot mount defines a channel to allow the wiring to pass from the slider to the pivot.

In some cases, the pivot includes a through hole to allow the wiring to pass from the slider to the earphone.

In certain cases, the pivot rotates about a pivot axis relative to the pivot mount. The pivot axis may be off-center (relative to a centerline of the slider), thereby allowing the wiring to be routed along a far side of the pivot axis.

In another aspect, headphones include a cushion assembly and a slider telescopingly received within the cushion assembly. The headphone also includes an earphone and a yoke that couples the earphone to the slider. A pivot is disposed at an open end of the slider and coupling the yoke to the slider. A pivot mount cap secures the pivot to the slider. The pivot mount cap sits proud of the open end of the slider thereby preventing direct contact between the yoke and the slider.

Implementations may include one of the above and/or below features, or any combination thereof.

In some implementations, the slider includes a hollow tube

In certain implementations, the hollow tube has an oblong cross-sectional shape.

In some cases, the headphones includes a groove formed in an inner surface of the slider and the pivot mount cap includes a ridge that engages the groove thereby inhibiting separation of the pivot mount cap from the slider.

In certain cases, the pivot includes a protuberance that engages a groove in the yoke.

In some examples, the slider defines a slot that allows the pivot to rotate relative to the slider.

In certain examples, a pivot mount supports the pivot at the open end of the slider.

In some implementations, the pivot mount has a U-shaped body with a pair of arms each of which defines a cavity for receiving a corresponding one of a pair of dampers.

In certain implementations, the dampers contact the pivot to damp motion of the pivot and help to center the pivot between the arms.

Commonly labeled components in the FIGURES are considered to be substantially equivalent components for the purposes of illustration, and redundant discussion of those components is omitted for clarity. Numerical ranges and values described according to various implementations are merely examples of such ranges and values and are not intended to be limiting of those implementations. In some cases, the term "about" is used to modify values, and in these cases, can refer to that value+/−a margin of error, such as a measurement error, which may range from up to 1-5 percent.

DETAILED DESCRIPTION

Figure 1:
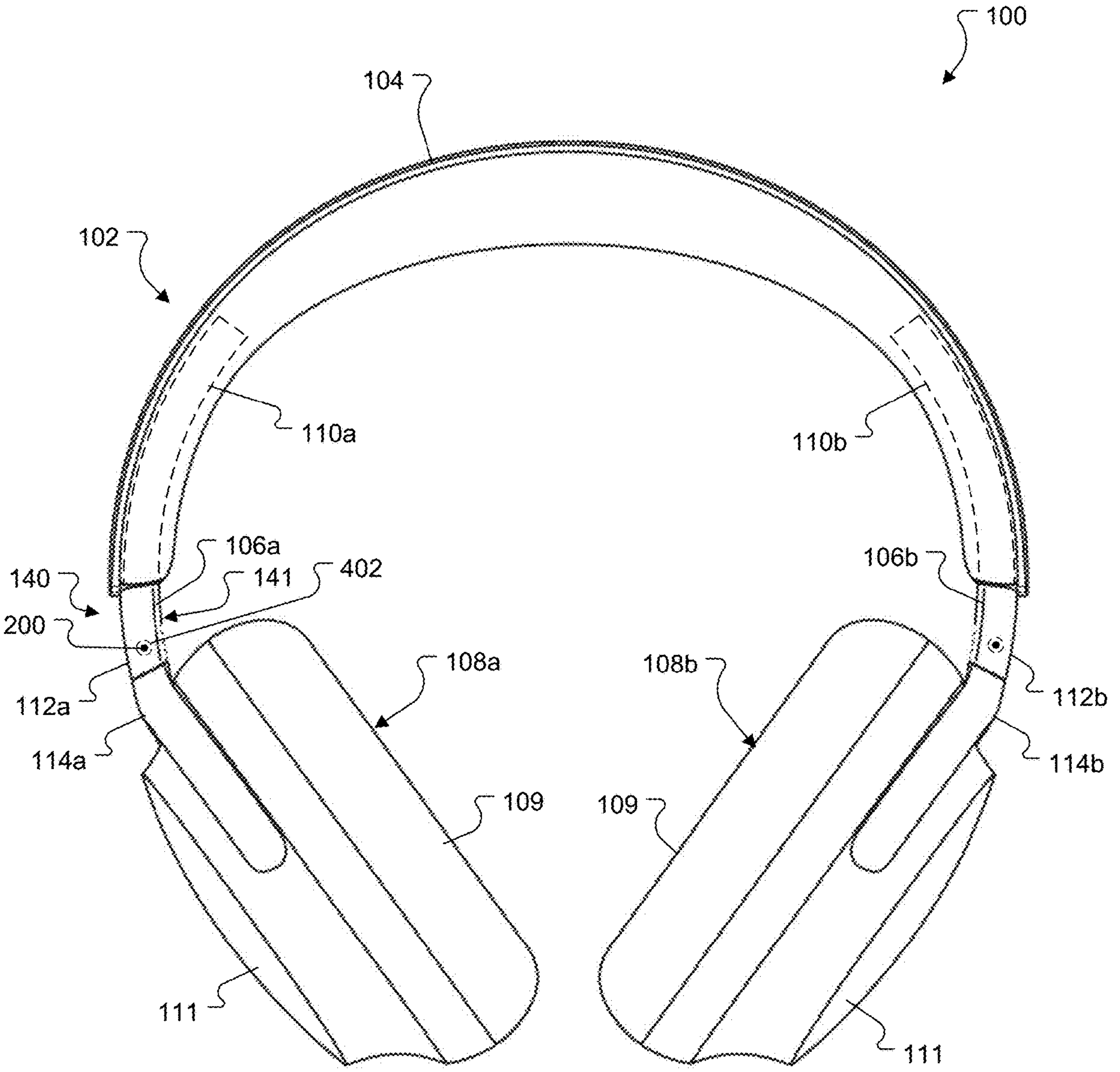
FIG. 1 is a front view of a pair of headphones.

FIG. 1 shows headphones 100. Headphones 100 include headband 102 which includes flat tubular cushion assembly 104 that is constructed and arranged to be placed over the crown of the head of a person. Tubular sliders 106*a* and 106*b*

(collectively "106") support earphones 108*a* and 108*b* (collectively "108"). The sliders engage with cushion assembly 104 in a manner which allows the sliders to be moved in and out of the cushion assembly to adjust the overall length of the headband so that they headphones can sit comfortably on, in or over the ears of the wearer. This overall arrangement of headphones is known in the art. Also, in some cases a microphone (not shown) can be included so that the headphones can be used as a headset. Further, some headphones or headsets include only one earphone, in which case there may be only one slider.

Cushion assembly 104 is preferably generally tubular. This arrangement allows the sliders to be received within the volume on the inside of the tube and also allows wiring to pass along the length of the cushion assembly. Sliders 106*a* and 106*b* are located in part in this interior volume of the cushion assembly. Each slider has a proximal end 110*a*, 110*b* located in the cushion assembly (e.g., end 110*a* of slider 106*a*) and a distal end 112*a*, 112*b* (e.g., end 112*a* of slider 106*a*). Coupling members 114*a* and 114*b* (collectively "114") are pivotably coupled to sliders 106. The coupling members each carry an earphone 108 (a/k/a "earpiece") at their far ends. Earphones 108*a* and 108*b* are shown in FIG. 1. Each of the earphones 108 includes an ear cushion 109 and an earcup 111 that supports an electro-acoustic transducer 113 (FIG. 2).

Figure 6:
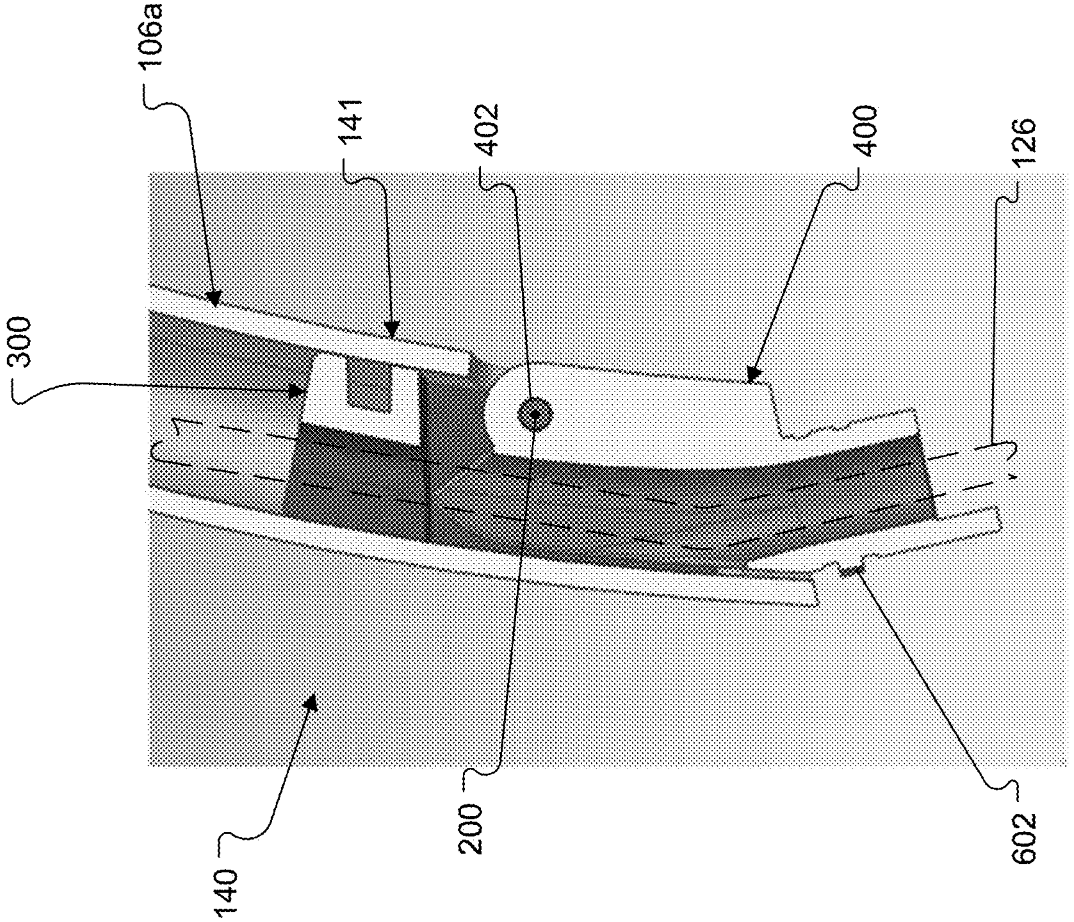

The sliders are preferably but not necessarily each generally hollow tubes with a generally flat exterior surface that lies closest to the head. With reference to FIGS. 1 and 6, slider 106*a* has flat exterior surface 141 of lower half 140 of the slider tube. Pivot axis 200 that is defined by pivot pin 402 lies below surface 141 and is generally parallel to surface 141. The sliders may have an oblong cross-sectional shape, such as a stadium (aka "racetrack"), oval or elliptical shape.

Figure 2:
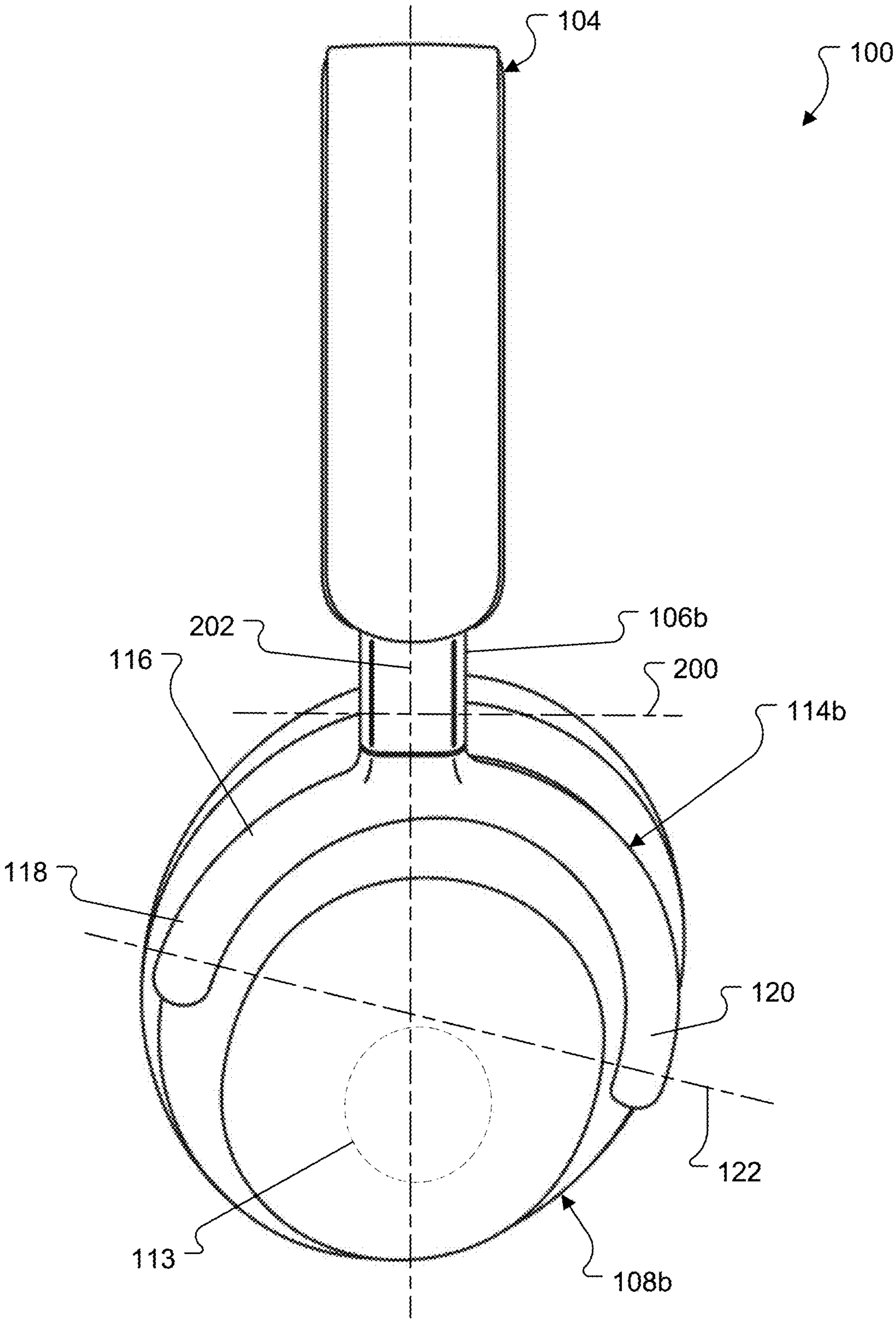
FIG. 2 is a side view of the headphones of FIG. 1.

An example of a coupling member 114*b* is shown in more detail in FIG. 2. FIG. 2 shows the left coupling member 114*b*. A mirror-image of the design would be used for the right coupling member 114*a*. Coupling member 114*b* comprises a yoke 116 with legs 118 and 120 that carry earphone 18. Earphone coupling members (a/k/a "first and second protrusions 1010 and 1012" (FIG. 10A)) are coupled to earphone 108*b* and allow it to rotate about axis 122. Also, coupling member 114*b* is engaged with slider 106*b* in a manner to allow the yoke to pivot about axis 202.

A conductive cable 126 (a/k/a "wiring") (FIG. 6) interconnects earphones 108*a* and 108*b* and carries the audio signals that are played by the earphones. Cable 126 is flexible, and runs through coupling members 114*a* and 114*b*, sliders 106*a* and 106*b*, and cushion assembly 104. Cable 126 needs to have sufficient length to accommodate both sliders being slid out of the cushion assembly to their endpoints, and also allow the earphones to be moved from the deployed position to the stowed position. At the same time, cable 126 needs to be managed so that it is unlikely to be bunched or pinched during use.

Unlike some conventional around-ear headphone products, which include plastic yokes, the headphones 100 may include a machined metal yoke. This can provide a desirable look and feel, but unlike the plastic yokes used in certain prior art headphones, which were elastically deformable to fit around the earcup during assembly, these metal yokes are not pliable. Thus, a different manner of coupling these yokes to an earcup may be needed.

Pivot Attachment

Figure 3:
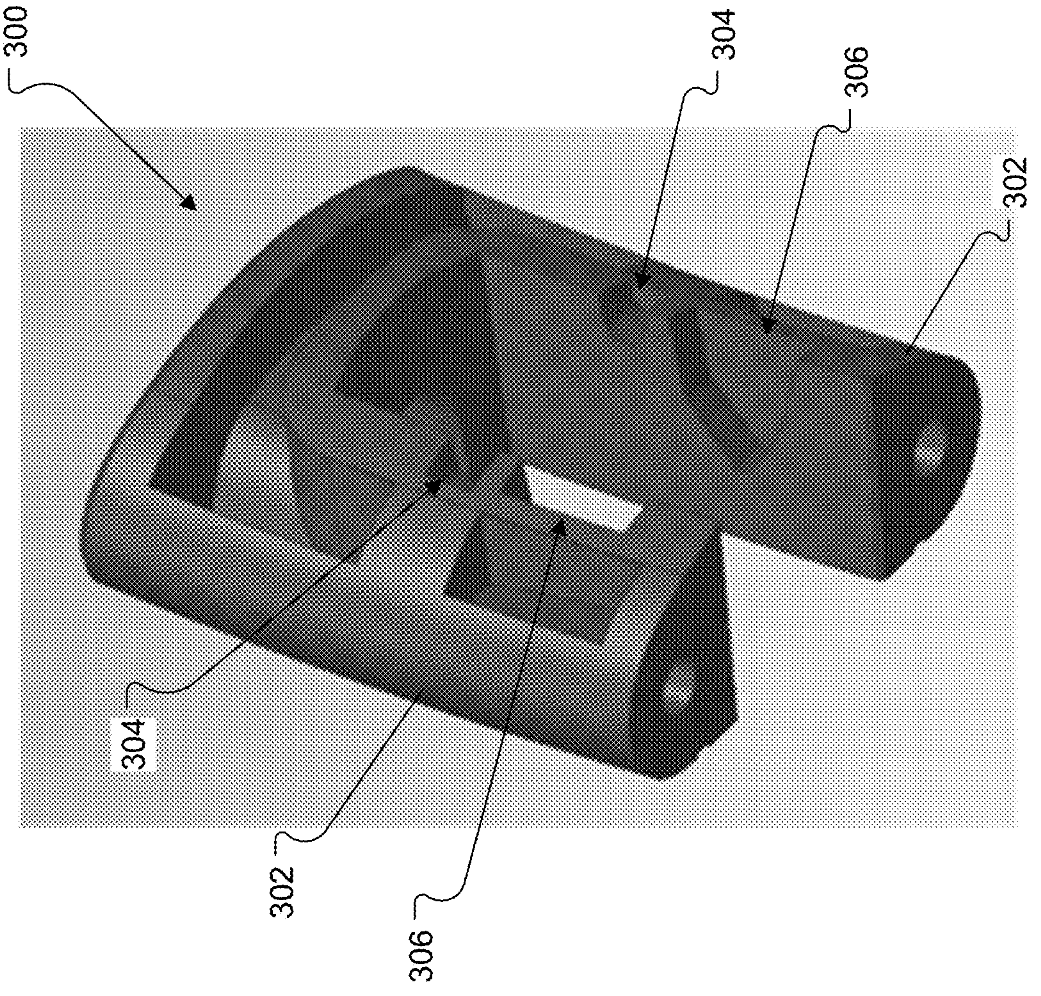
FIG. 3 is a perspective view of a pivot mount from the headphones of FIG. 1.
Figure 4:
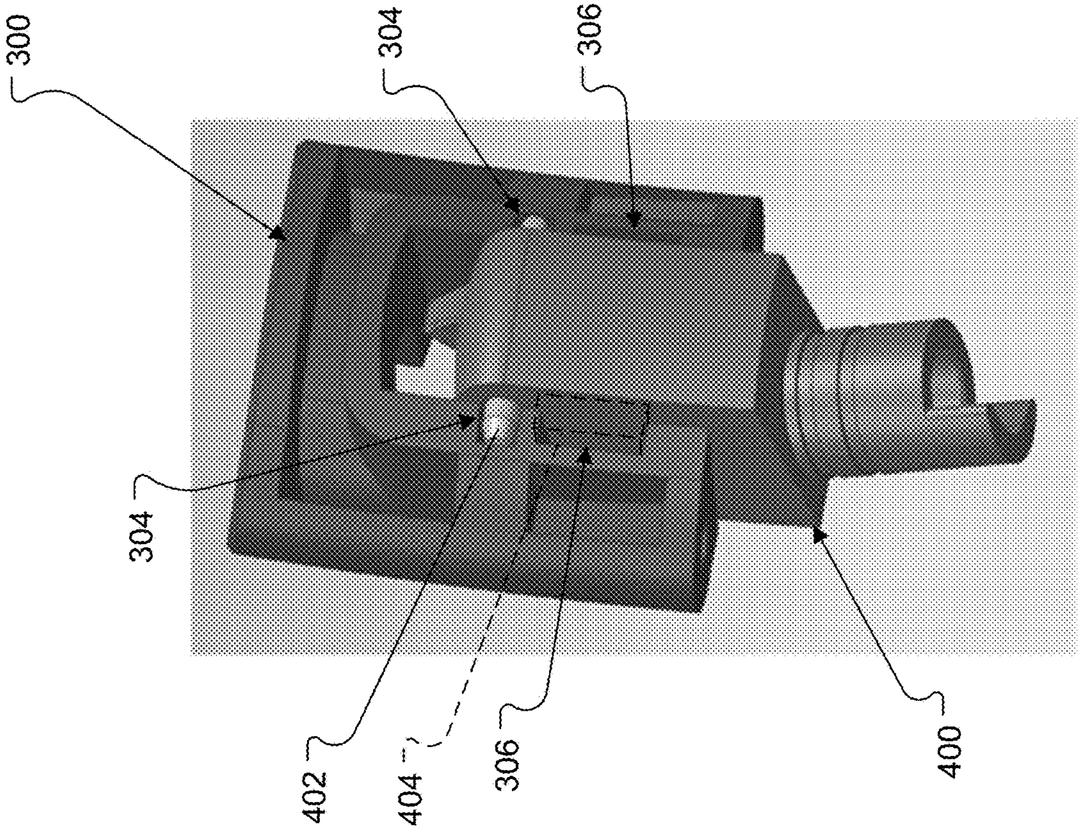
FIG. 4 is a perspective view showing a pivot mounted in the pivot mount of FIG. 3.

With reference to FIG. 3, a pivot mount 300 is provided in each of the sliders 112. The pivot mount 300 is a U-shaped plastic part with two arms 302 that each define a recess 304 for receiving a pivot pin 402 (FIG. 4) of a pivot 400. FIG. 4 shows the pivot 400 mounted to the pivot mount 300 with its pivot pin 402 resting in the recesses 304. The arms 302 further define a pair of cavities 306 for receiving silicone dampers 404. The silicone dampers create friction to provide damped feel when the pivot is folded, and they also help to center pivot within the slider.

Figure 5:
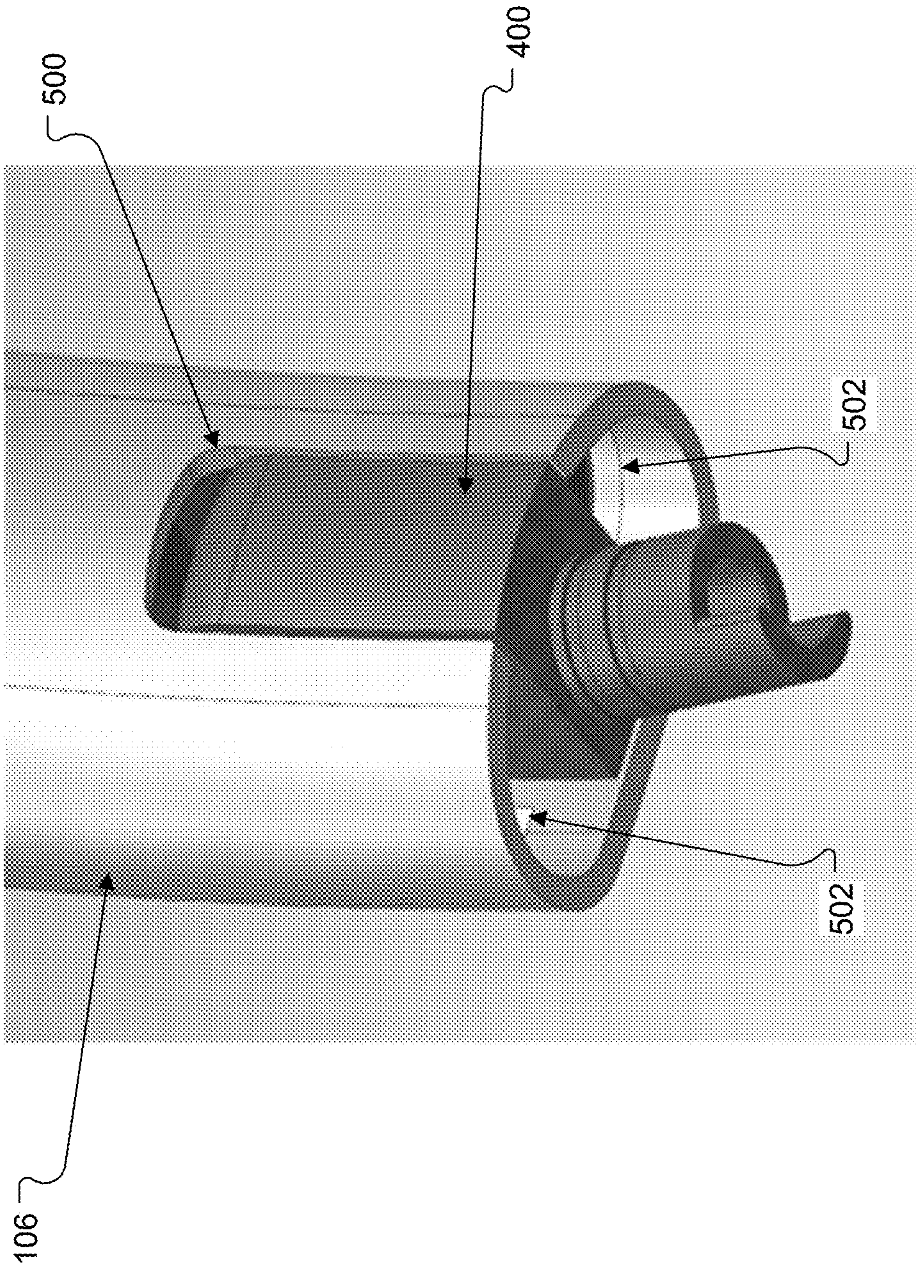
FIGS. 5 and 6 are perspective and cross-sectional side views, respectively, of the pivot and pivot mount of FIG. 4 shown inserted into a slider of the headphones of FIG. 1.

FIGS. 5 and 6 show the pivot and pivot mount subassembly inserted into an open end of a corresponding one of the sliders 106. The slider 106 is generally in the form of a hollow tube (e.g., extruded aluminum). A wall of the slider 106 holds the pivot pin 402 and the silicone dampers 404 in place in the respective recesses in the pivot mount 300. The slider 106 defines a slot (or a notch) 500 that allows the pivot to rotate, about the pivot pin 402, relative to the slider 106. As shown in FIG. 6, the pivot axis 200 is off-center, which allows the conductive cable (not shown) to go to the far side of the pivot axis 200, which is beneficial because it hides the cable from the outside when the pivot is folded.

Figure 7:
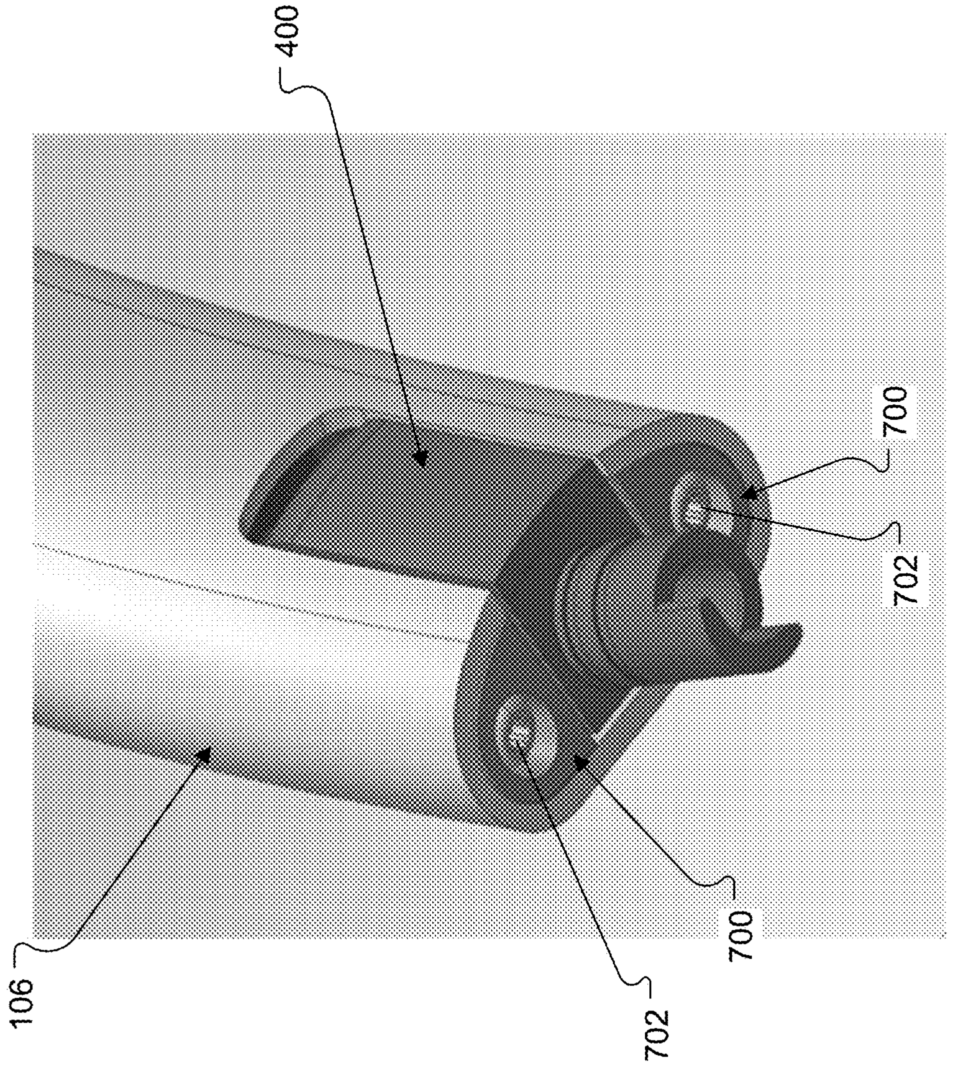
FIG. 7 is a perspective view showing a pair of pivot mount caps for securing the pivot and pivot mount in the slider.
Figure 8:
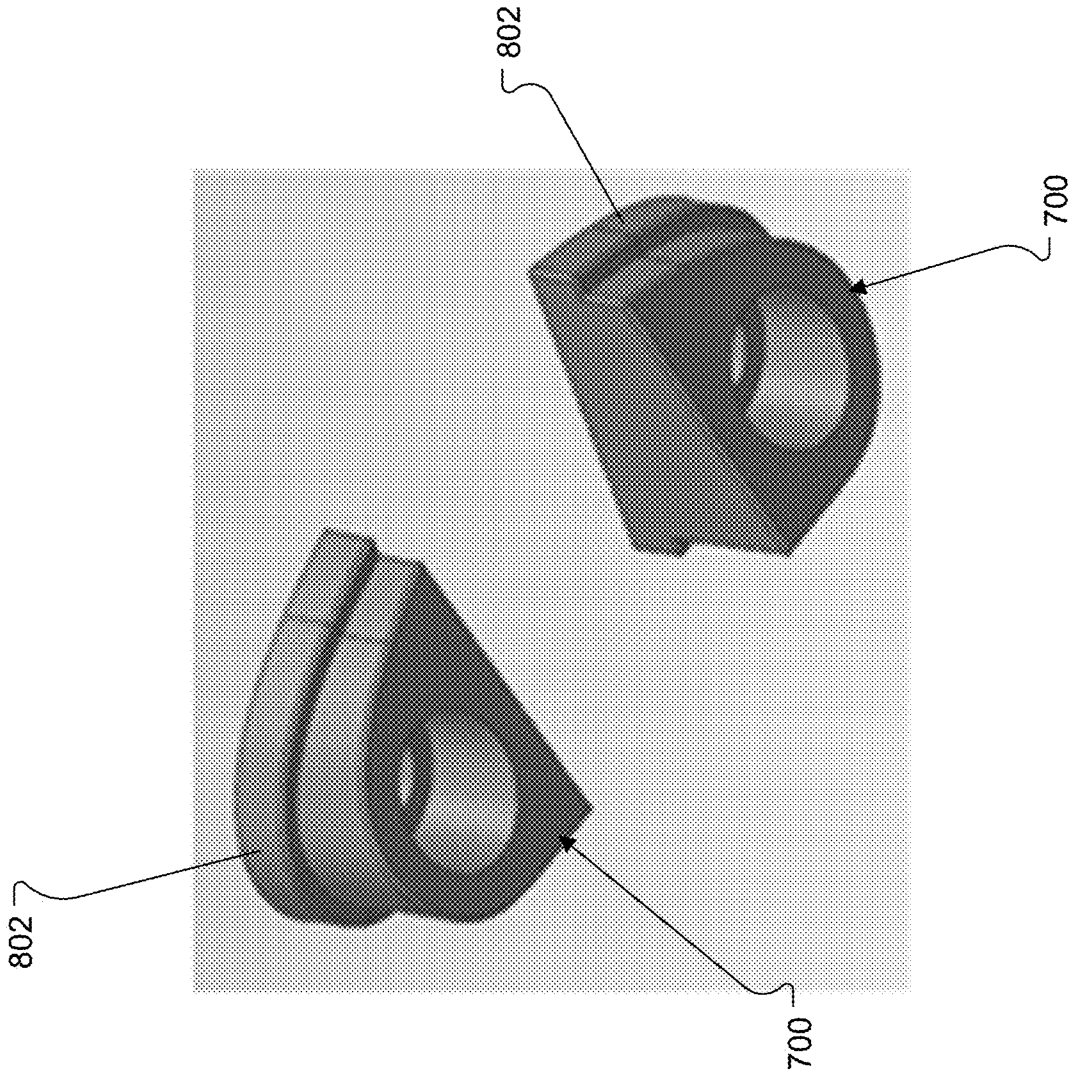
FIG. 8 is a perspective view showing the pair of pivot mount caps from FIG. 7.

With reference to FIG. 7, the pivot and pivot mount subassembly is secured in place within the slider 106 by a pair of pivot mount caps 700, which are secured to the free ends of the arms 302 (FIG. 3) of the pivot mount 300 with a pair of screws 702. FIG. 8 shows the pivot mount caps 700, which are generally T-shaped. Each of the pivot mount caps 700 includes a ridge 802 that is configured to engage a corresponding groove 502 (FIG. 5) along the inner surface of the slider 106. The pivot mount caps 700 are installed by rotating (pivoting) the pivot 400 away from open end of the slider 106 and inserting the pivot mount caps 700 near the center of the open end of the slider 106, and then pushing the pivot mount caps 700 off to the side so that the ridges 802 engage the grooves 502 in the wall of the slider 106. Once the pivot mount caps 700 are in place, the screws 702 are installed to prevent the pivot mount caps 700 from moving. Thus, the screws holding the assembly in place are arranged at the open end of the slider 106, and, as a result, this hardware is hidden after the yoke 116 (FIG. 2) has been installed to help provide the headphone with a seamless look without visible fasteners.

Figure 9:
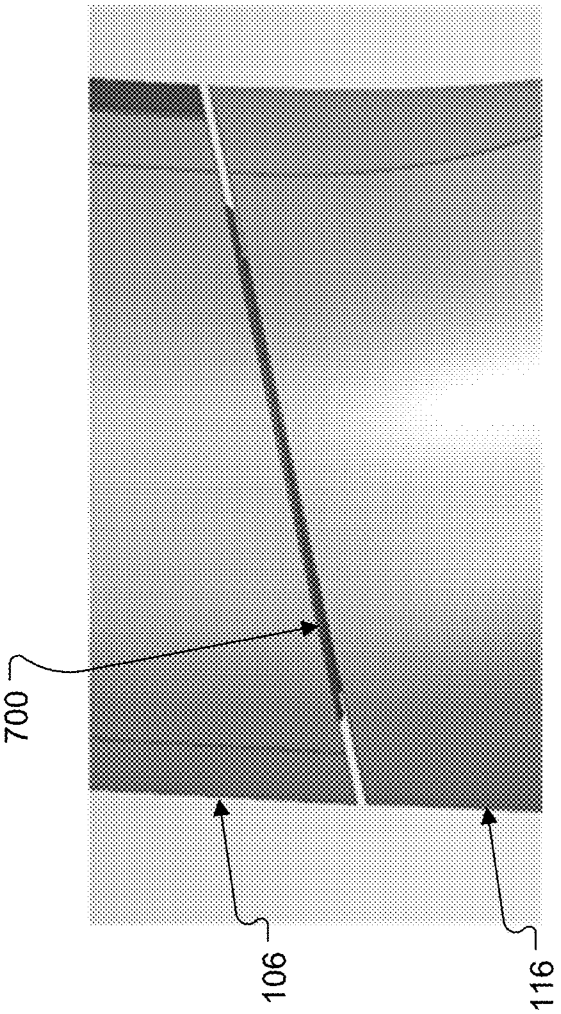
FIG. 9 is a detailed view showing a protruding portion of the pivot mount caps contacting a yoke of headphones.

The pivot mount caps 700 also serve another purpose. In that regard, the pivot mount caps 700 sit slightly proud (above flush) of the end of the slider 106 and provide a surface for the aluminum yoke 116 to rub against so as to prevent aluminum-on-aluminum contact between the yoke 116 and the slider 106, as shown in FIG. 9.

Yoke Attachment

Figure 10A:
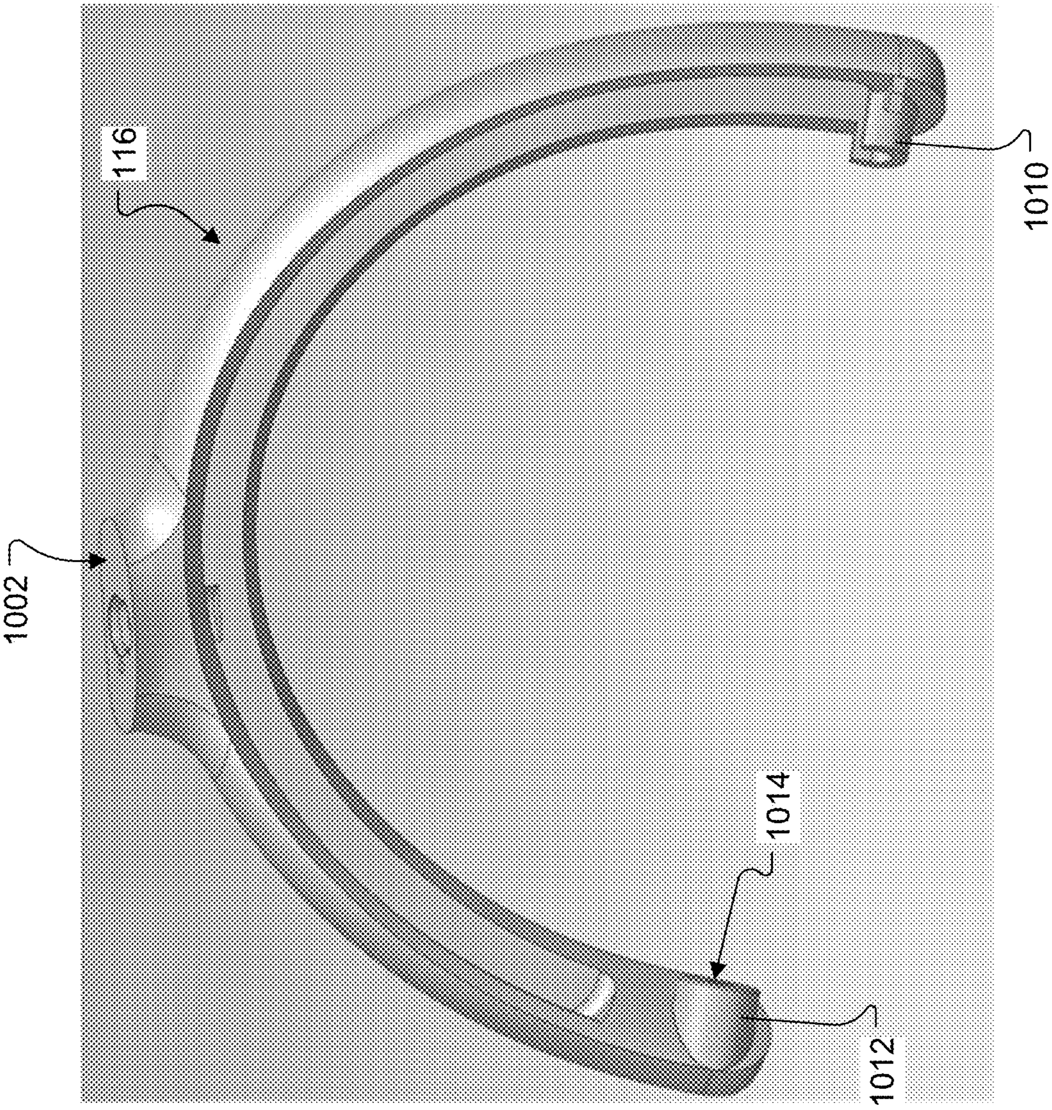
FIG. 10A is a perspective view of a yoke from the headphones of FIG. 1.
Figure 10B:
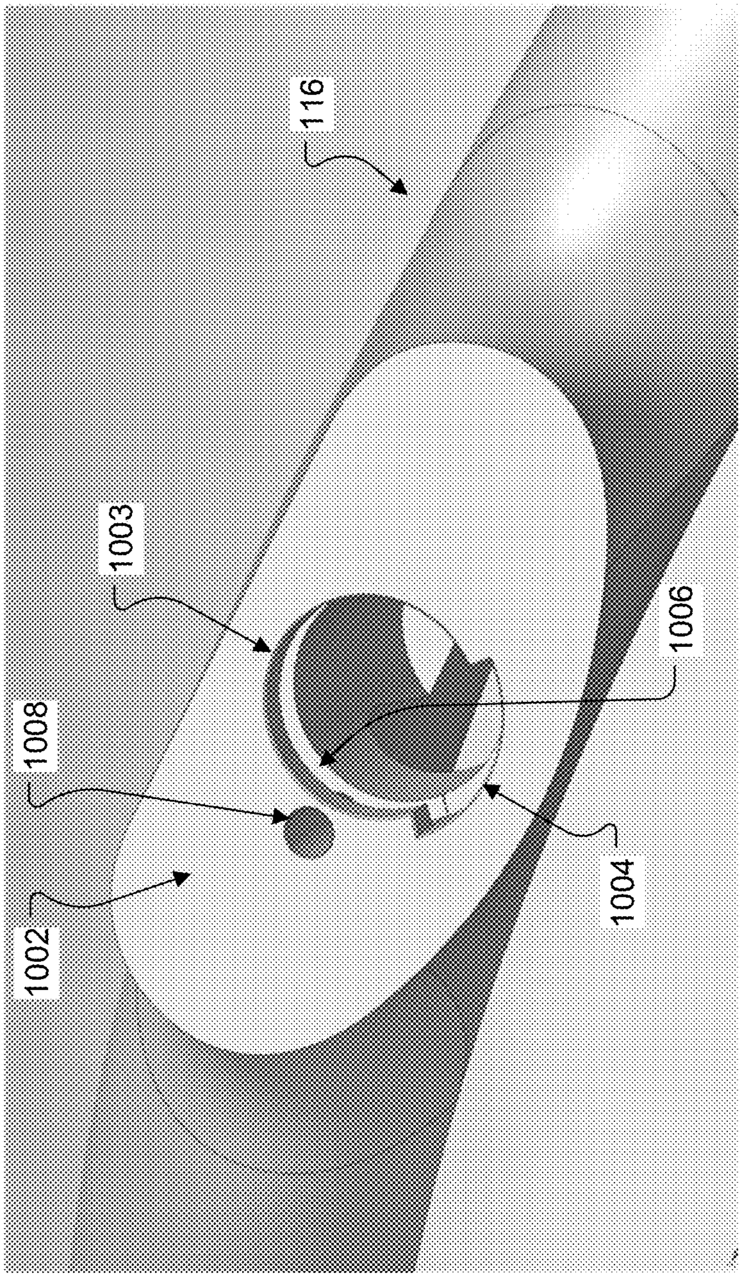
FIG. 10B is a detailed perspective view showing a top surface of the yoke from FIG. 10A.

FIGS. 10A & 10B show one of the right yokes 116 (a mirror-image of the design would be used for the other yoke). The yoke 116 includes a top surface 1002 that mates with a corresponding one of the siders 106 of the headband 102 via a corresponding one of the pivots 400 (FIG. 7). An opening 1003 with a pocket 1004 is provided in the top surface 1002 of the yoke 116. The pocket 1004 terminates at a groove 1006 within the opening 1003. The groove 1006 extends partly around the opening 1003. A mating part on the pivot 400 has a protuberance 602 (FIG. 6) that is sized to fit in the pocket 1004. During assembly, the pivot 400 is inserted into the opening 1003 and the yoke 116 is then rotated relative to the pivot 400 such that the protuberance 602 rides in the groove 1006. Since the groove 1006 only extends part way around the opening 1003 there is a limit to rotation.

Figure 11:
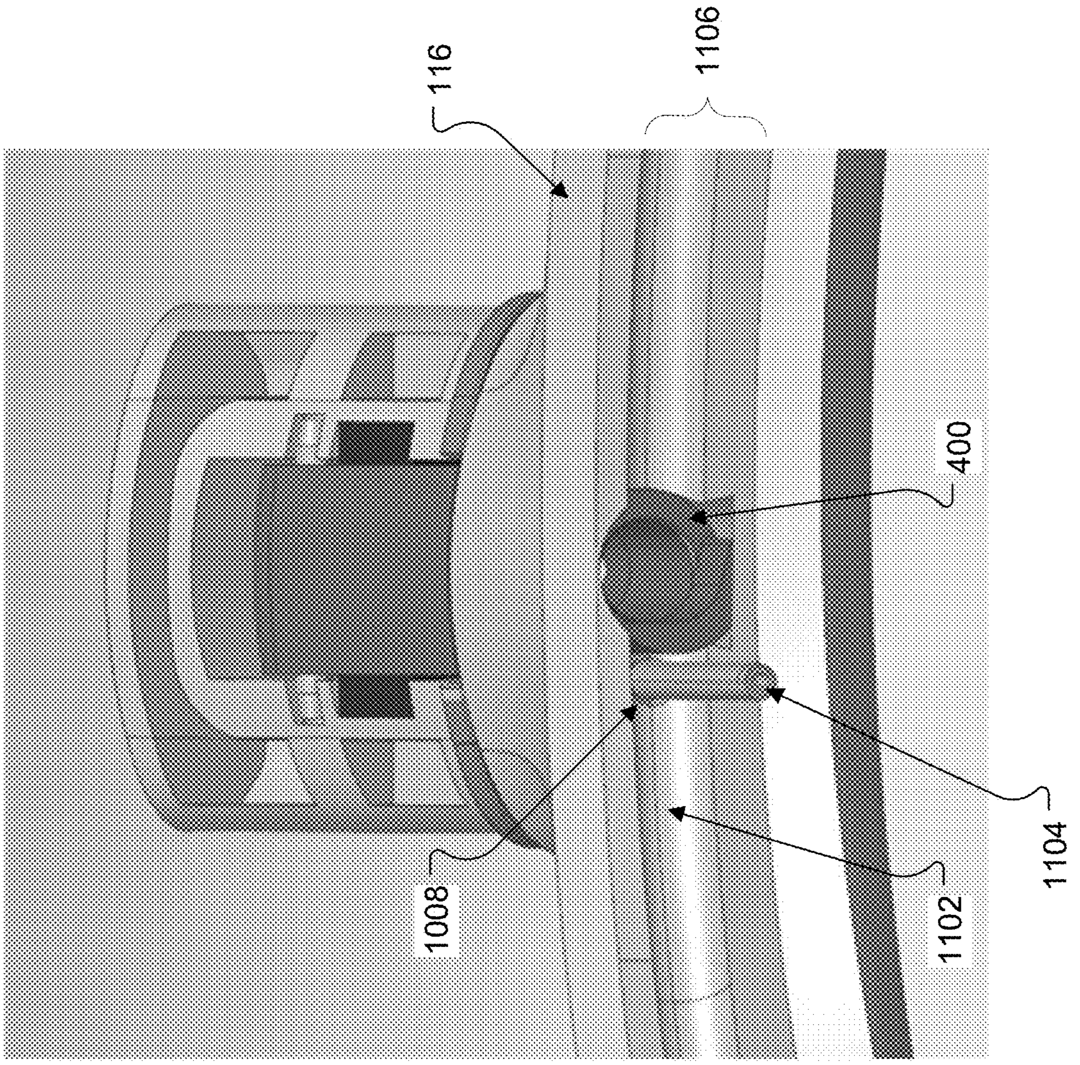
FIG. 11 is a detailed perspective view showing attachment of the yoke of FIG. 10B to the pivot of FIG. 4.

A hole 1008 extends from the top surface 1002 of the yoke 116 to a second, opposite surface 1102 (FIG. 11). With the pivot 400 inserted into the opening 1003 and the yoke 116 rotated such that the protuberance 602 is rotated within the groove 1006 and out of alignment with the pocket 1004, a pin 1104 (FIG. 11) is inserted into the hole 1108 from the second surface 1102. The pin 1104 prevents the protuberance 602 from being rotated back into alignment with the pocket 1004, thereby locking it within the groove 1006 and preventing separation of the yoke 116 from the pivot 400 and slider 106.

The second surface 1102 sits within a channel 1106 in the yoke 116 and is used to route the conductive cable (not shown) to the earcup 111 (FIG. 12) of a corresponding one of the earphones 108. The earcup covers, and thus hides, the conductive cable and the pin 1104 once it is mounted to the yoke 116. As a result, this hardware (i.e., the pin 1104) and conductive cable is hidden after the earcup has been installed to help provide the headphone with a seamless look without visible fasteners or wires.

Earcup Attachment

Figure 12:
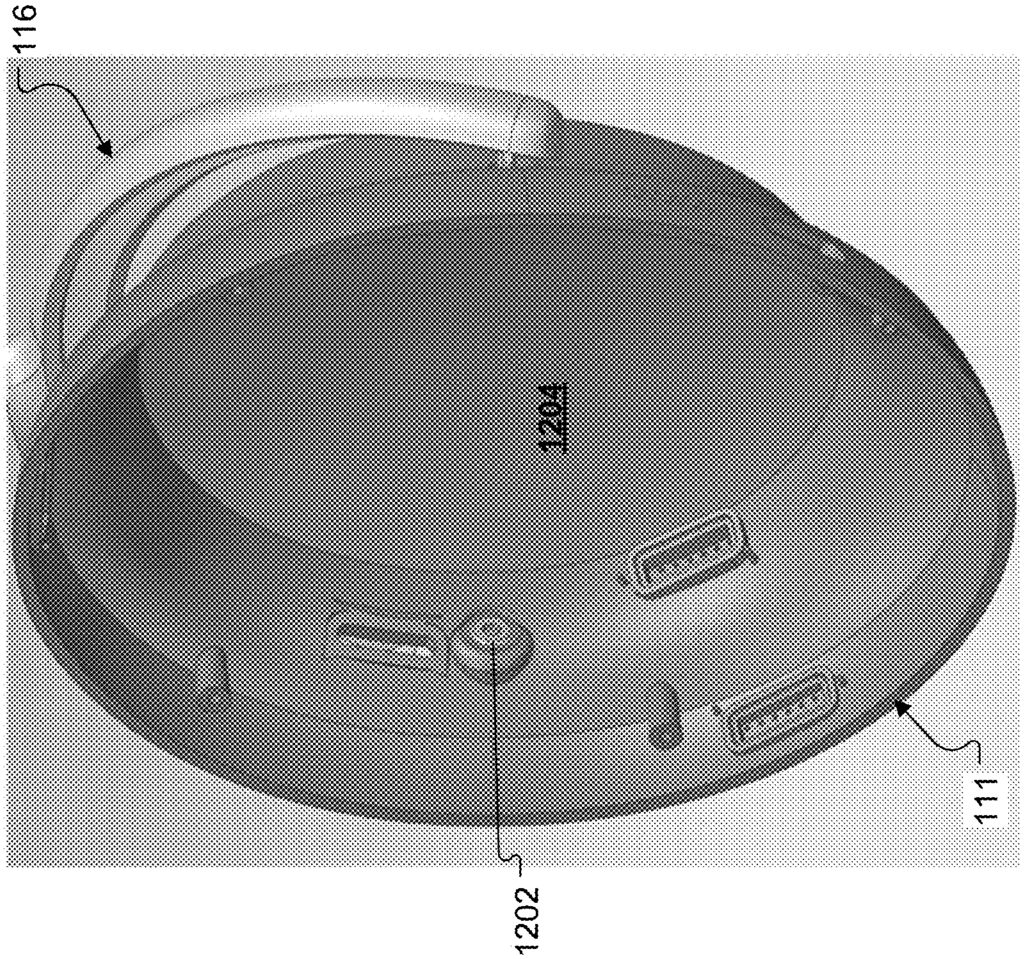
FIG. 12 is a perspective view showing the yoke of FIG. 10B attached to an earcup of the headphones of FIG. 1.
Figure 13:
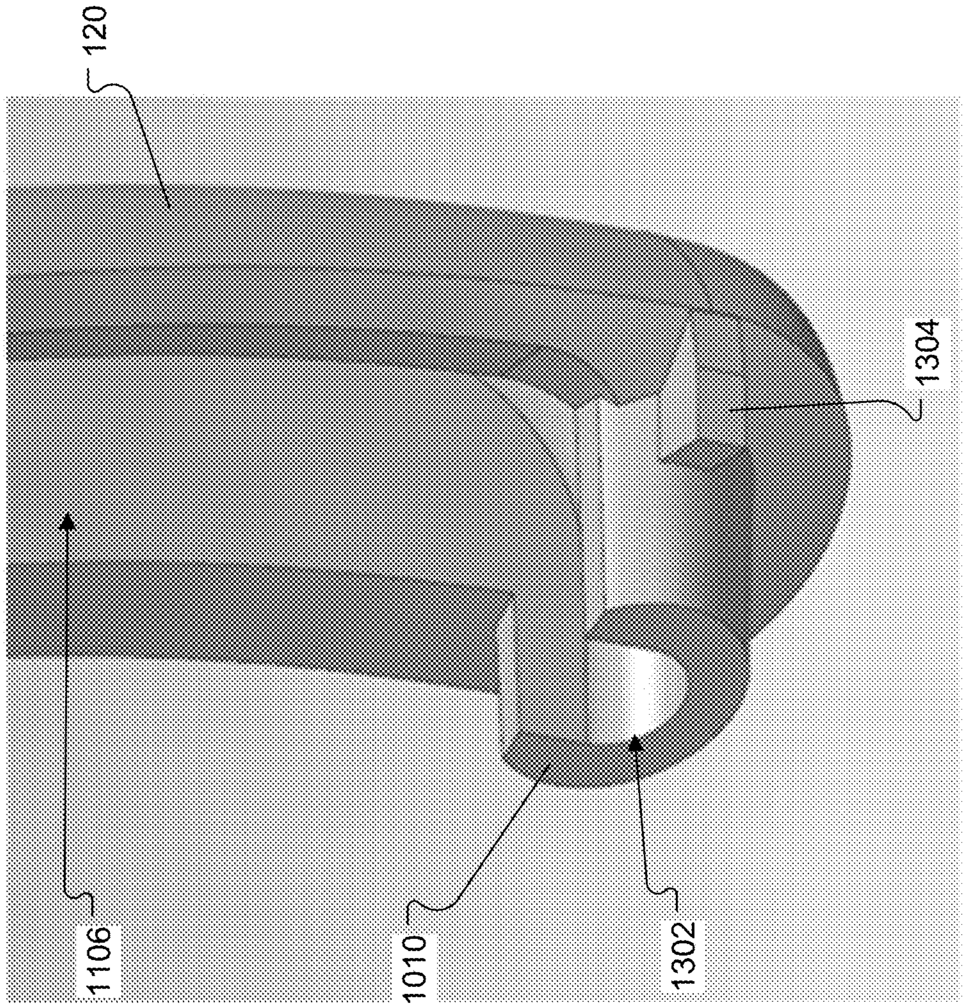
FIG. 13 is a detailed perspective view of an end portion of an arm of the yoke of FIG. 10B.

Referring again to FIG. 10A, the exemplary yoke 116 has first and second protrusions 1010 and 1012 (a/k/a "earphone coupling members"), respectively, which engage the earcup 111 (FIG. 12) to provide the pivot axis 200 (FIG. 2) about which the earcup 111 can pivot relative to the yoke 116. As shown in FIG. 13, the first protrusion 1010 has a semi-circular cross-section with a channel 1302 that runs through it. That channel 1302 is coupled with the channel 1106 in an associated arm 120 of the yoke 116 for routing the conductive cable (not shown) to the earcup 111. A rib 1304 extends outward from the protrusion 1010. Referring again to FIG. 10A, the second protrusion 1012 is generally in the shape of a hollow cylinder.

Figure 14A:
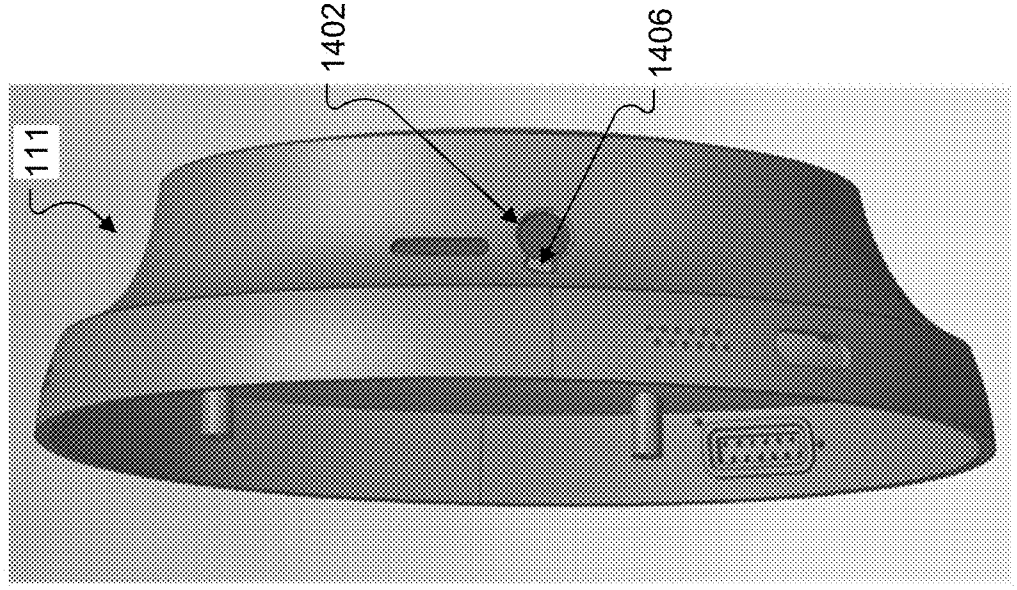
FIGS. 14A and 14B are perspective views of an earcup of the headphones of FIG. 1.
Figure 14B:
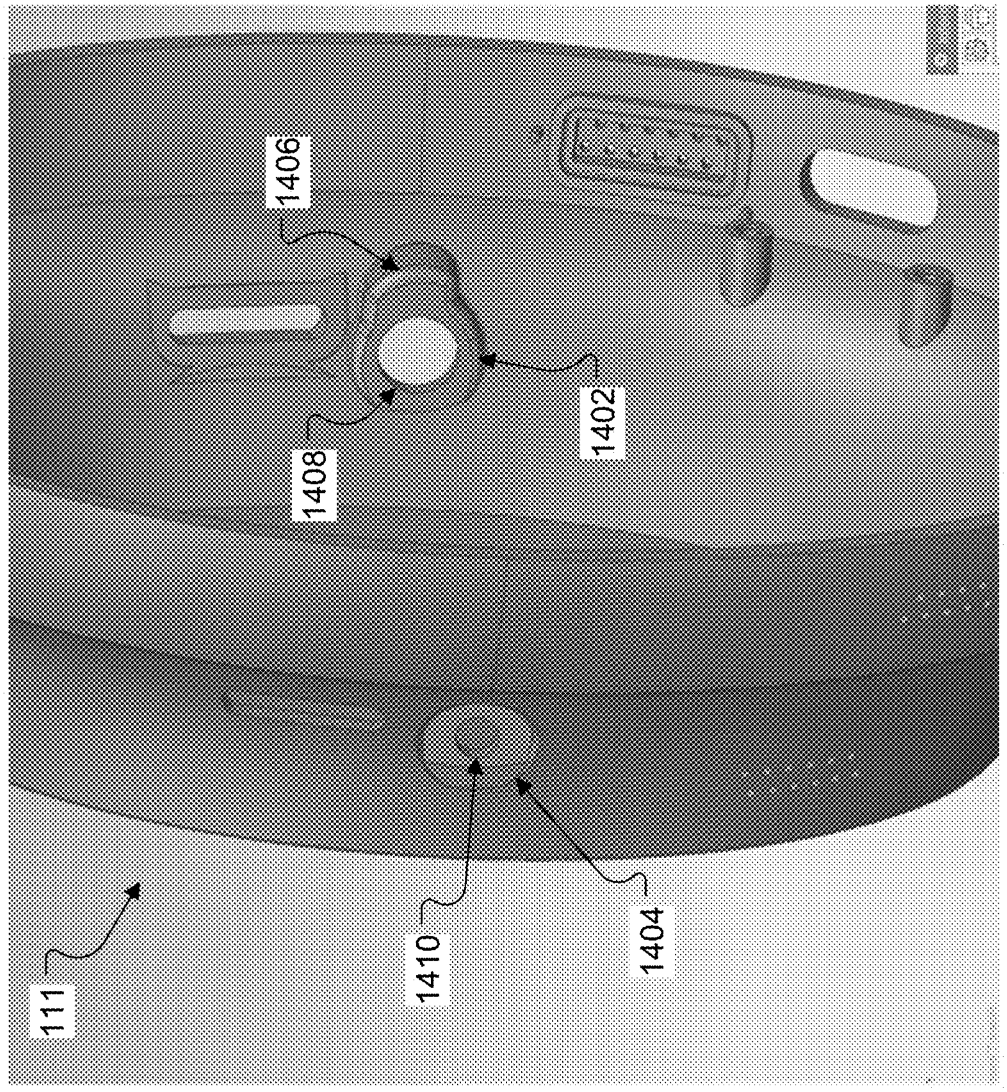

With reference to FIGS. 14A & 14B, the earcup 111 has first and second recesses 1402 and 1404, respectively, for receiving the protrusions 1010 and 1012 (FIG. 10A). The first and second recesses 1402 and 1404 are designed such that the protrusions 1010, 1012 can be slid into the recesses 1402, 1404 without deformation of the yoke 116.

As shown in FIG. 14A, the first recess 1402 includes a pocket 1406 for receiving the rib 1304 (FIG. 13) on the first protrusion 1010. The pocket 1406 is shaped to limit rotation of the earcup 111 by defining hard stops for the rib 1304. A first hole 1408 (FIG. 14B) extends through the first recess 1402 and aligns with the channel 1302 (FIG. 13) to allow cabling to pass therethrough for powering the earcup 111.

With reference to FIG. 14B, a second hole 1410 extends through the second recess 1410 and is arranged to be aligned with a tapped hole 1014 (FIG. 10A) in the second protrusion 1012. As shown in FIG. 12, a screw 1202 is inserted through the second hole 1410 from the interior 1204 of the earcup 111 and is threaded into the tapped hole 1014 (FIG. 10A) in the second protrusion 1012, thereby securing the earcup 111 to the yoke 116. The interior 1204 of the earcup 111 is covered by other components (not shown) during assembly, and, as a result, the screw is hidden to help provide the headphone with a seamless look without visible fasteners.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or a list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. Headphones comprising:

a cushion assembly;

a slider telescopically coupled to the cushion assembly, the slider comprising a proximal end disposed within the cushion assembly and a distal end extending outward from the cushion assembly;

a pivot mount disposed within an opening at the distal end of the slider;

a pivot supported in the pivot mount;

an earphone;

a yoke coupling the earphone to the slider;

a groove formed in an inner surface of the slider; and a pivot mount cap including a hole through which a fastener passes, thereby to secure the pivot mount cap to the pivot mount, and a ridge that engages the groove thereby inhibiting separation of the pivot mount cap from the slider, wherein the pivot mount is secured to the slider via the fastener, and wherein the yoke is pivotable to a position in which it covers the fastener when the headphones are in use.

2. The headphones of claim 1, wherein the pivot mount cap sits proud of the open end of the slider thereby preventing direct contact between the pivot and the slider.

3. The headphones of claim 1, further comprising a pivot pin extending through the pivot, wherein opposing ends of the pivot pin are each received in one of pair of recesses formed in the pivot mount.

4. The headphones of claim 3, wherein the slider defines a slot that allows the pivot to rotate, about the pivot pin, relative to the slider.

5. The headphones of claim 1, wherein the pivot mount has a U-shaped body with a pair of arms each of which defines a cavity for receiving a corresponding one of a pair of dampers.

6. The headphones of claim 5, wherein the dampers contact the pivot to damp motion of the pivot and help to center the pivot between the arms.

7. The headphones of claim 1, wherein wiring for powering the earphone extends through the slider.

8. The headphones of claim 7, wherein the pivot mount defines a channel to allow the wiring to pass from the slider to the pivot.

9. The headphones of claim 8, wherein the pivot includes a through hole to allow the wiring to pass from the slider to the earphone.

10. The headphones of claim 8, wherein the pivot rotates about a pivot axis relative to the pivot mount, wherein the pivot axis is off-center, relative to a centerline of the slider, thereby allowing the wiring to be routed along a far side of the pivot axis.

11. Headphones comprising:

a cushion assembly;

a slider telescopingly received within the cushion assembly;

an earphone;

a yoke coupling the earphone to the slider;

a pivot disposed at an open end of the slider and coupling the yoke to the slider;

a groove formed in an inner surface of the slider; and a pivot mount cap including a hole through which a fastener passes and a ridge that engages the groove thereby inhibiting separation of the pivot mount cap from the slider, wherein the pivot mount cap sits proud of the open end of the slider thereby preventing direct contact between the yoke and the slider.

12. The headphones of claim 11, wherein the slider comprises a hollow tube.

13. The headphones of claim 12, wherein the hollow tube has an oblong cross-sectional shape.

14. The headphones of claim 11, wherein the slider defines a slot that allows the pivot to rotate relative to the slider.

15. The headphones of claim 11, further comprising a pivot mount, which supports the pivot at the open end of the slider.

16. The headphones of claim 15, wherein the pivot mount has a U-shaped body with a pair of arms each of which defines a cavity for receiving a corresponding one of a pair of dampers.

17. The headphones of claim 16, wherein the dampers contact the pivot to damp motion of the pivot and help to center the pivot between the arms.

* * * * *